March 10, 1953  K. C. MERKLING  2,630,688
MEANS FOR FURNISHING REFRIGERATION TO MOBILE UNITS
Filed June 2, 1950
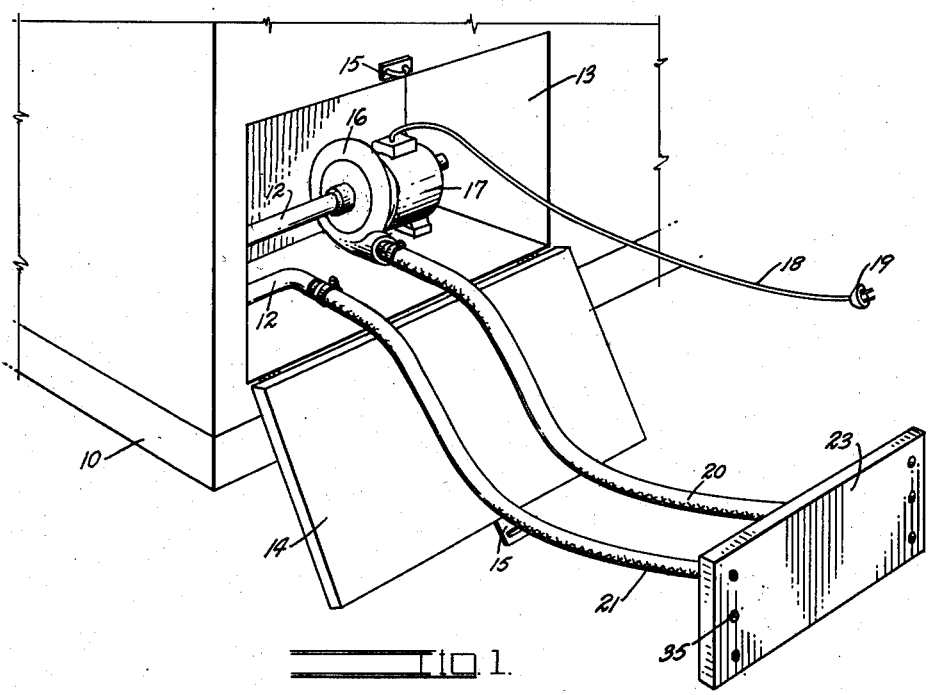
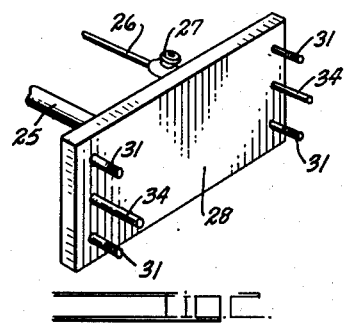
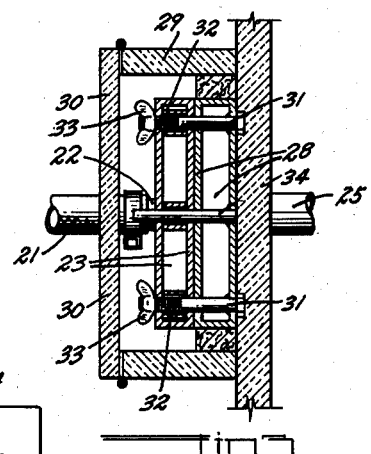
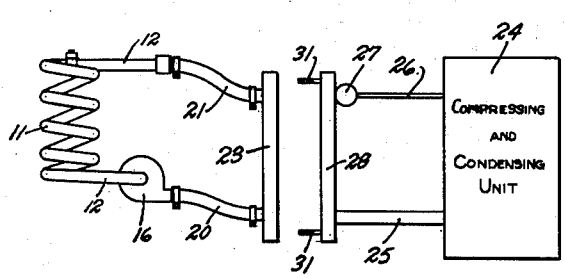
INVENTOR.
KENNETH C. MERKLING
BY
ATTORNEY Patented Mar. 10, 1953

2,630,688

UNITED STATES PATENT OFFICE 2,630,688

MEANS FOR FURNISHING REFRIGERATION TO MOBILE UNITS

Kenneth C. Merkling, Havre, Mont.

Application June 2, 1950, Serial No. 165,795

6 Claims. (Cl. 62—117)

This invention relates to means for furnishing refrigeration to trucks, cars, aircraft, and other mobile units where it would be impractical to carry complete refrigerating plants.

Refrigeration has not been practical on air liners, buses, and cars due to weight considerations. The principal object of this invention is to provide means whereby the heavy refrigerating plants would be located at fixed, spaced ground stations. The mobile craft would be provided with a circulating fluid system such as brine reservoirs, cooling coils, and circulating pumps from which the heat would be transferred at ground stations located at convenient points on the route.

Another object of the invention is to provide a refrigerating system of the station-transfer type in which it will be unnecessary to connect or disconnect any hoses, pipes, or other fluid conduits so that all leakage losses will be eliminated when making the various heat-transfer contacts at the ground stations, Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a fragmentary, perspective view illustrating a portion of the vehicle installation of the improved refrigerating system;

Fig. 2 is a similar view illustrating a portion of the station installation;

Fig. 3 is a cross-section through the connected elements of the vehicle and station; and Fig. 4 is a diagram of the improved refrigerating system.

In Fig. 1 a portion of a vehicle, such as a truck, car, airplane, etc., is indicated at 10. The vehicle is piped in any desired way to provide coils of cooling tubing or piping, as indicated at 11 in the diagram of Fig. 4. The terminal ends of the cooling piping, indicated at 12, are brought into a pump compartment 13 opening to the side of the vehicle. Access may be had to the compartment 13 by means of an exterior swinging door 14 provided with any suitable latching mechanism 15.

The compartment 13 contains a suitable circulating pump 16 driven from an electric motor 17. Current is supplied to the motor 17 through a conductor cord 18 terminating in a connecting plug 19. One of the terminal ends 12 of the cooling coils 11 is connected to the intake of the pump 16.

A first flexible hose 20 extends from the discharge of the pump 16, and a second similar hose 21 extends from the other terminal end 12. The hoses 20 and 21 extend to nipples 22 projecting from adjacent the extremities of the rear face of a hollow heat exchange plate 23. This provides a completely closed circulating system. When the pump 17 is operating, the brine or other fluid in the system circulates through the heat exchange plate 23, thence through the cooling coils 11, thence back to the pump 16. The connections at the pump are not important, that is, the pump could discharge into the cooling coils 11 and intake from the plate 23, if preferred.

The station equipment consists of any suitable refrigerating system, as indicated in its entirety by the box 24 on the diagram of Fig. 4. Such a system will contain a conventional compressor and condensing unit. The evaporated refrigerant is returned to the compressor through a conduit 25, and the refrigerant fluid is conducted from the condensing unit by a refrigerant tube 26 leading to an expansion valve 27.

The return conduit 25 and the expansion valve 27 are mounted on the back of, and communicate with, the hollow interior of a refrigerated plate 28 which serves as a refrigerant evaporator. The refrigerated plate is contained within an insulated box 29 suitably mounted at the refrigerating station. The box is closed by means of double, spring-hinged doors 30.

The plates 23 are preferably formed from any suitable metal of high-heat conductivity, such as copper or aluminum or suitable alloys thereof. A plurality of threaded studs 31 project from the refrigerated plate 28, and the transfer plate 23 is provided with tubular stud passages 32, sealed from the hollow interior of the plate, and positioned to receive the studs 31.

When the vehicle is traveling, the hoses 20 and 21 and the transfer plate 23 are stored in the box 13, and the cold brine in the coils 11 adsorbs heat from the vehicle interior. When a station is reached, the lid 14 is opened and the plate 23 is withdrawn and slipped over the studs 31 of the refrigerated plate, where it is tightly clamped by means of suitable nuts 33. The contacting surfaces of the two plates 23 and 28 are machined smooth to obtain contact over their entire areas. The doors 30 of the box 29 are allowed to close to reduce external heat absorption, and the plug 19 is inserted in a suitable current source.

The pump 16 operates to circulate the brine through the transfer plate 23. The heat from the brine is absorbed by the cold contacting surfaces of the two plates and transferred to the evaporated refrigerant in the plate 28. Thus, the temperature of the brine is rapidly lowered until it approaches the temperature of the refrigerated plate 28.

The plate 23 and the plug 19 are now disconnected and stored in the box 13, and the vehicle continues on its way, with the re-chilled brine assuming its heat absorption duties.

It is preferred to employ elongated dowel pins 34 on the plate 28 to enter dowel holes 35 in the hollow plate 23 to guide the stud holes 32 onto the studs 31 without damage to the threads of the latter.

The size of the plates 23 and 28 should be such as to obtain a surface contact area sufficient to transfer the heat expected in the time interval allowed. It will be noted that both the refrigerant circuit and the brine circuit remain closed and sealed at all times, so that leakage is entirely avoided in making the station connections.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A refrigerating system comprising: a traveling vehicle; a stationary station; sealed brine-circulating means in said vehicle; a hollow heat-transfer plate interconnected in said circulating means; a refrigerating plant at said station; a hollow evaporator plate in the cooling circuit of said refrigerating plant; and means for temporarily securing said heat-transfer plate against the evaporator plate of said station as the vehicle reaches the station during its travel from station to station to transfer heat from the vehicle to the station.

2. A refrigerating system comprising: a traveling vehicle; a stationary station; sealed brine-circulating means in said vehicle; a hollow heat-transfer plate interconnected in said circulating means; a refrigerating plant at said station; a hollow evaporator plate in the cooling circuit of said refrigerating plant; means for temporarily securing said heat-transfer plate against the evaporator plate of said station as the vehicle reaches the station during its travel from station to station to transfer heat from the vehicle to the station; means fixedly supporting the respective evaporator plate at said station; and flexible hoses communicating between said brine-circulating means and said transfer plate said hoses being sufficiently long and flexible to allow the latter plate to be moved independently of said brine-circulating means so that it may be brought into contact with the evaporator plate of said station after the vehicle has come to rest adjacent said station.

3. A refrigerating system comprising: a traveling vehicle; a stationary station; sealed brine-circulating means in said vehicle; a hollow heat-transfer plate interconnected in said circulating means; a refrigerating plant at said station; a hollow evaporator plate in the cooling circuit of said refrigerating plant; means for temporarily securing said heat-transfer plate against the evaporator plate of said station as the vehicle reaches the station during its travel from station to station to transfer heat from the vehicle to the station; means fixedly supporting the respective evaporator plate at said station; flexible hoses communicating between said brine-circulating means and said transfer plate said hoses being sufficiently long and flexible to allow the latter plate to be moved independently of said brine-circulating means so that it may be brought into contact with the evaporator plate of said station after the vehicle has come to rest adjacent said station; and an enclosure on said vehicle for containing said transfer plate and said hoses while traveling.

4. A circulating fluid system for a refrigerated mobile vehicle not carrying its own refrigerating plant, comprising: sealed brine-circulating means mounted in said vehicle; a hollow heat transfer plate interconnected in said circulating means; and means for temporarily securing said heat transfer plate to an evaporator plate of a stationary refrigeration plant.

5. In a circulating fluid system as described in claim 4, flexible hoses communicating between said brine-circulating means and said transfer plate.

6. In a circulating fluid system as described in claim 5, an enclosure on said vehicle for containing said transfer plate and said hoses.

KENNETH C. MERKLING.

REFERENCES CITED

The following references are of record in the file of this patent:

UNITED STATES PATENTS

| Number | Name | Date |
|---|---|---|
| 1,506,103 | Wishart | Aug. 26, 1924 |
| 1,642,015 | Cramer | Sept. 13, 1927 |
| 1,894,014 | Wolf | Jan. 10, 1939 |
| 2,160,389 | Palmer | May 30, 1939 |
| 2,301,313 | Money | Nov. 10, 1942 |
| 2,401,460 | Charland | June 4, 1946 |
| 2,561,305 | Limpert et al. | July 17, 1951 |